United States Patent [19]

Fukushima et al.

[11] Patent Number: 5,124,924
[45] Date of Patent: Jun. 23, 1992

[54] POINT SELECTING APPARATUS FOR USE IN AN ON-BOARD NAVIGATION SYSTEM

[75] Inventors: Atsuhiko Fukushima; Morio Araki, both of Kawagoe, Japan

[73] Assignee: Pioneer Electronic Corporation, Tokyo, Japan

[21] Appl. No.: 727,399

[22] Filed: Jul. 5, 1991

Related U.S. Application Data

[63] Continuation of Ser. No. 322,198, Mar. 13, 1989, abandoned.

[30] Foreign Application Priority Data

Jun. 27, 1988 [JP] Japan ................ 63-158287

[51] Int. Cl.[5] .................................................. G06F 15/50
[52] U.S. Cl. ........................... 364/449; 364/443; 340/995
[58] Field of Search .................. 364/449, 443, 424.01, 364/436; 340/990, 995

[56] References Cited

U.S. PATENT DOCUMENTS

| | | | |
|---|---|---|---|
| 4,511,973 | 4/1985 | Miura et al. | 364/449 |
| 4,635,202 | 1/1987 | Tsujii et al. | 364/449 |
| 4,667,561 | 6/1987 | Akama et al. | 364/449 |
| 4,757,455 | 7/1988 | Tsunoda et al. | 364/449 |
| 4,761,742 | 8/1988 | Hanabusa et al. | 364/443 |
| 4,862,374 | 8/1989 | Ziemann | 364/449 |

Primary Examiner—Thomas G. Black
Attorney, Agent, or Firm—Foley & Lardner

[57] ABSTRACT

A point selecting apparatus for use in an on-board navigation system configured to display a map on a display on the basis of map data stored in a memory. The apparatus is characterized by the provision of a plurality of point-select keys, four cursor keys, a delete command key, a register command key, and a control means adapted to perform control operations to eliminate from the memory or register into the memory coordinate data of a point in the vicinity of a point indicated by the position of a cursor after a key entry of any one of the plurality of point-select keys, in response to a key entry of the delete command key or the register command key.

2 Claims, 6 Drawing Sheets

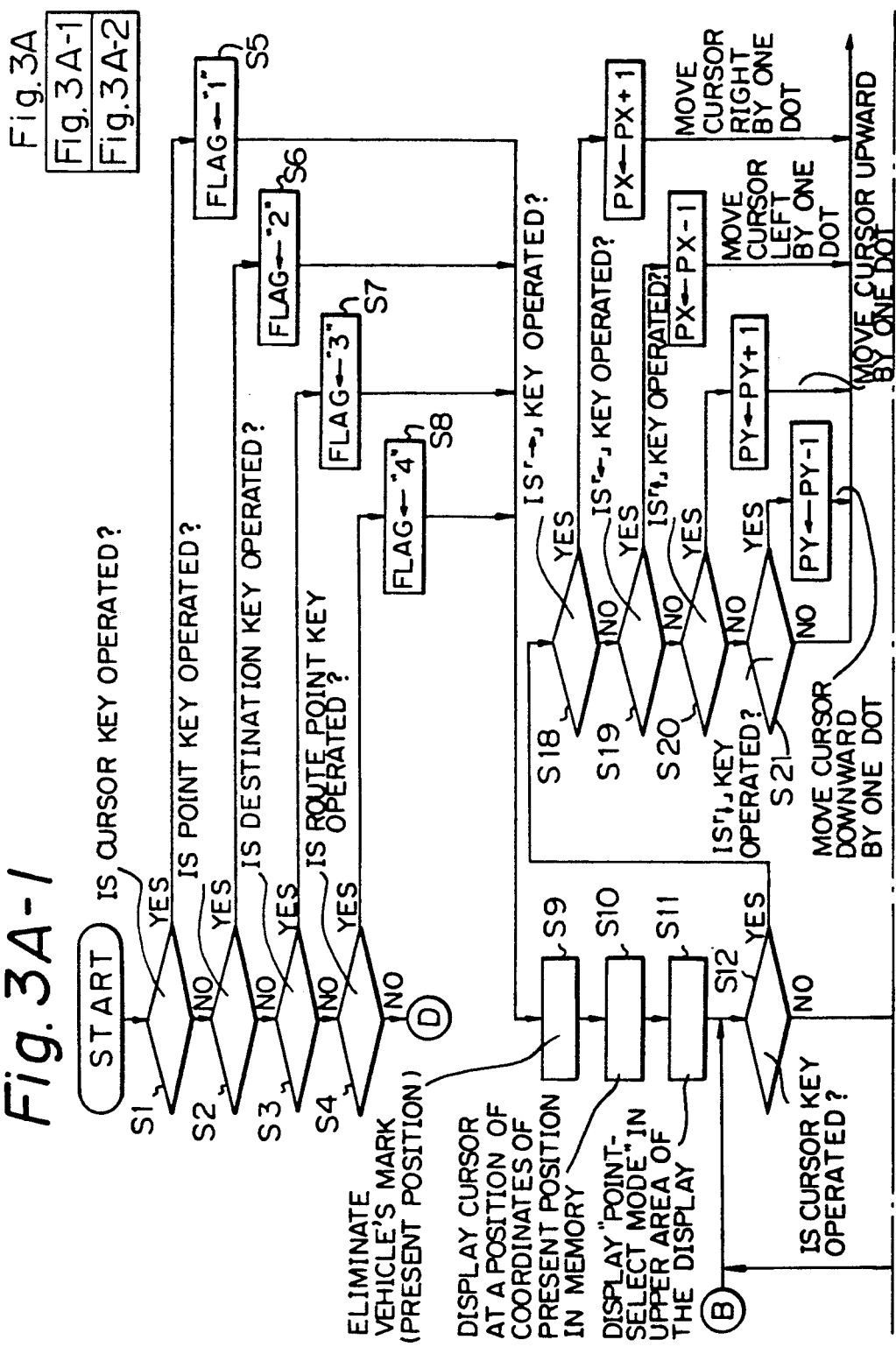

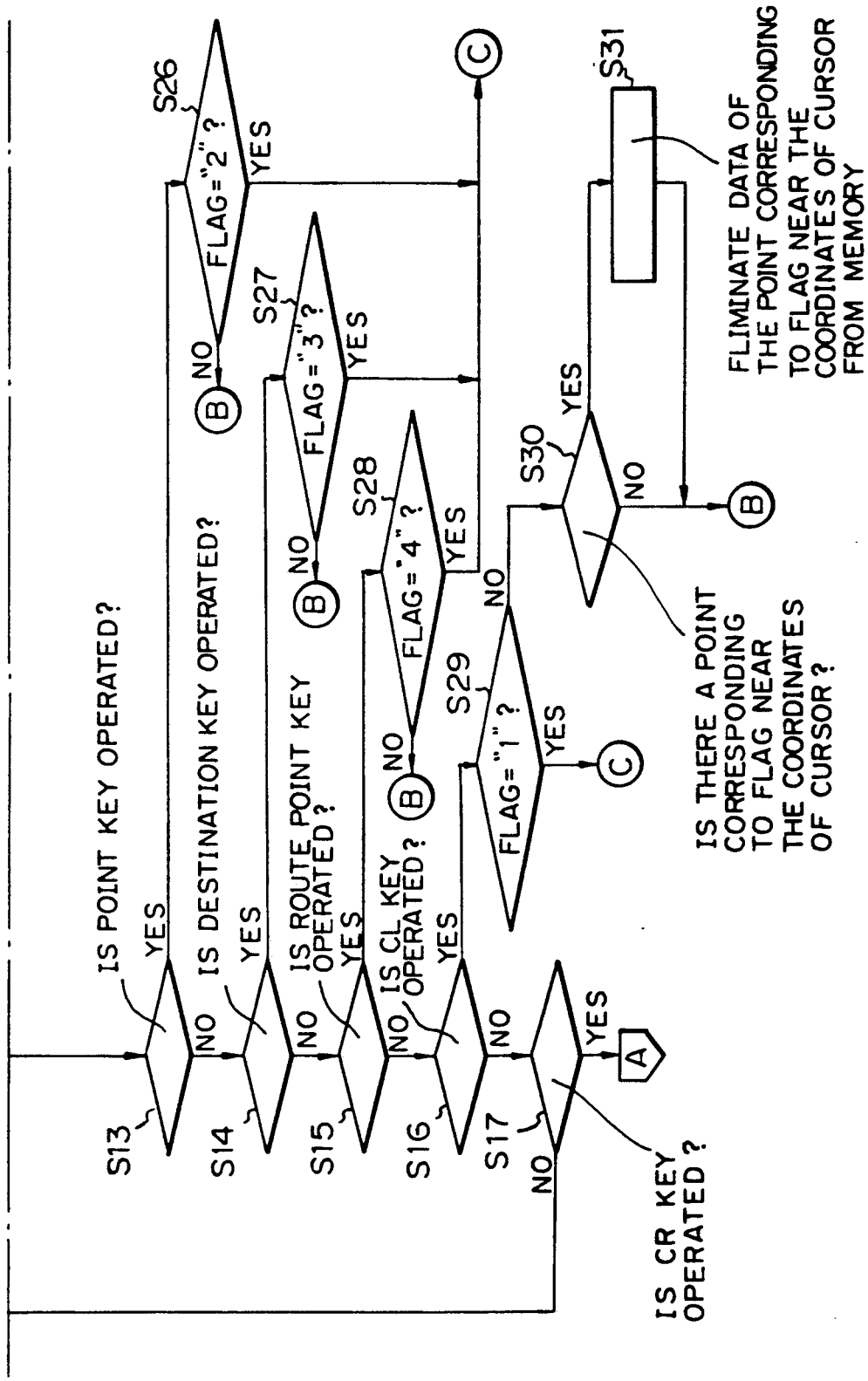

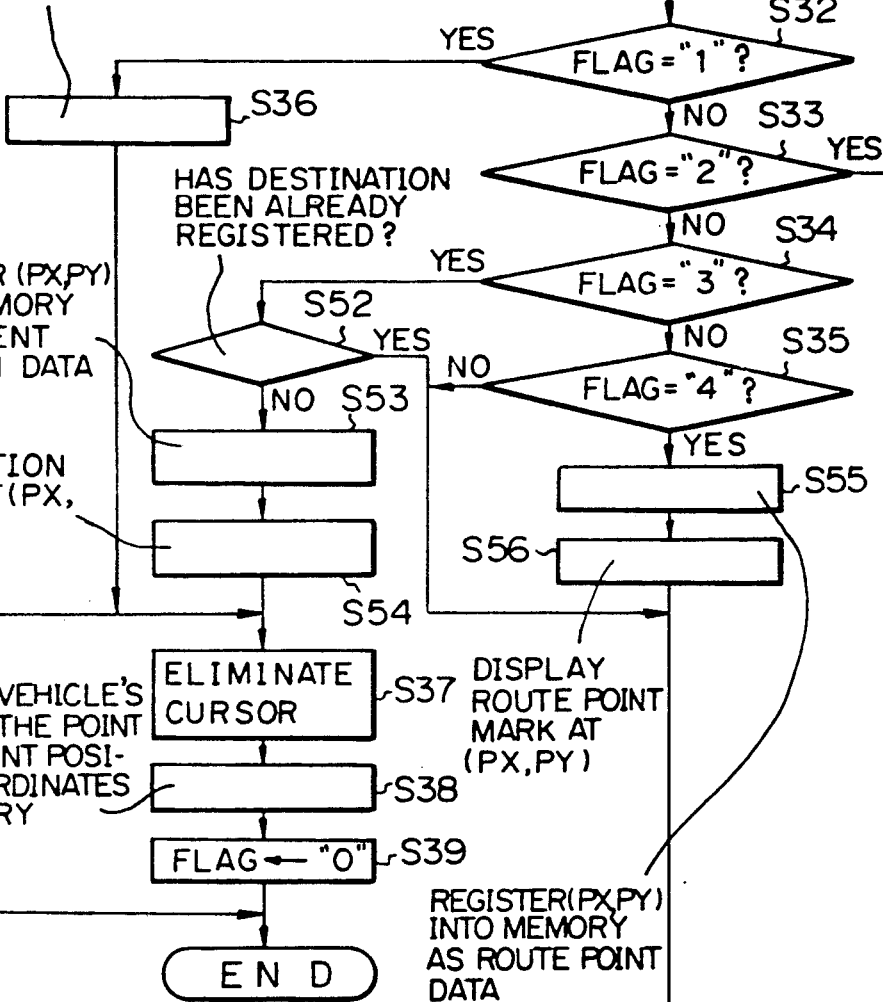

POINT SELECTING APPARATUS FOR USE IN AN ON-BOARD NAVIGATION SYSTEM

This application is a continuation of application Ser. No. 07/322,198, filed Mar. 13, 1989, now abandoned.

BACKGROUND OF THE INVENTION

1. Field of the Invention

The present invention relates to an apparatus for selecting points for use in an on-board (mounted in a vehicle) navigation system.

2. Description of Background Information

Recently, navigation systems to be mounted in a vehicle have been developed and are entering into a stage of practical application. Navigation systems are constructed such that digitized map data is previously stored in a memory, map data of a region covering a given area including the present position of the vehicle is read out from the memory while the present position of the vehicle is being recognized, so that a map around the location of the vehicle is displayed on a display, and a "vehicle's own position" indicating the present position of the vehicle is automatically indicated in the map being displayed.

In the case of such navigation systems, a number of key operations are required for generating various commands. However, there inherently are spatial limitations since such navigation systems are to be installed in the vehicle. Moreover, in view of the fact that the keys are to be operated by the driver while driving the vehicle, the number of operation keys should be reduced to be as small as possible. On the other hand, the number of operation keys can be reduced by assigning a plurality of functions to each of the operation keys. However, it would be senseless if the key operation becomes intricate by assigning a plurality of functions to each operation key.

OBJECT AND SUMMARY OF THE INVENTION

The present invention is based on the above points, and an object to the present invention is to provide a point selecting apparatus for use in an on-board navigation system, in which only a small number of operation keys are used, and the operation of the keys is very much simplified.

According to the present invention, a point selecting apparatus for use in an on-board navigation system comprises a plurality of point-select keys each having a different function, four cursor keys for commanding movement of a cursor displayed on a display screen in four directions of upward, downward, left and right directions on the display screen, a delete command key for commanding the elimination of coordinate data of a point near a point where the cursor is placed, a register command key for commanding the registration of coordinate data of the point near the point where the cursor is placed, wherein coordinate data of an area around a point indicated by the position of the cursor is deleted or registered in response to a key entry (depressing) of the delete command key or the register command key, the position of the cursor being set by the cursor key after a key entry using any one of the plurality of point-select keys.

BRIEF DESCRIPTION OF THE DRAWINGS

FIGS. 3A-1, 3A-2, 3B-1 and 3B-2 are flowcharts showing the procedure of selecting points which is executed by the CPU; and FIGS. 3A and 3B are diagrams respectively showing the arrangement of FIGS. 3A-1 and 3A-2, and the arrangement of FIGS. 3B-1 and 3B-2.

DETAILED DESCRIPTION OF PREFERRED EMBODIMENTS

The embodiment of the present invention will be explained in detail hereinafter with reference to the accompanying drawings.

Figure 1:
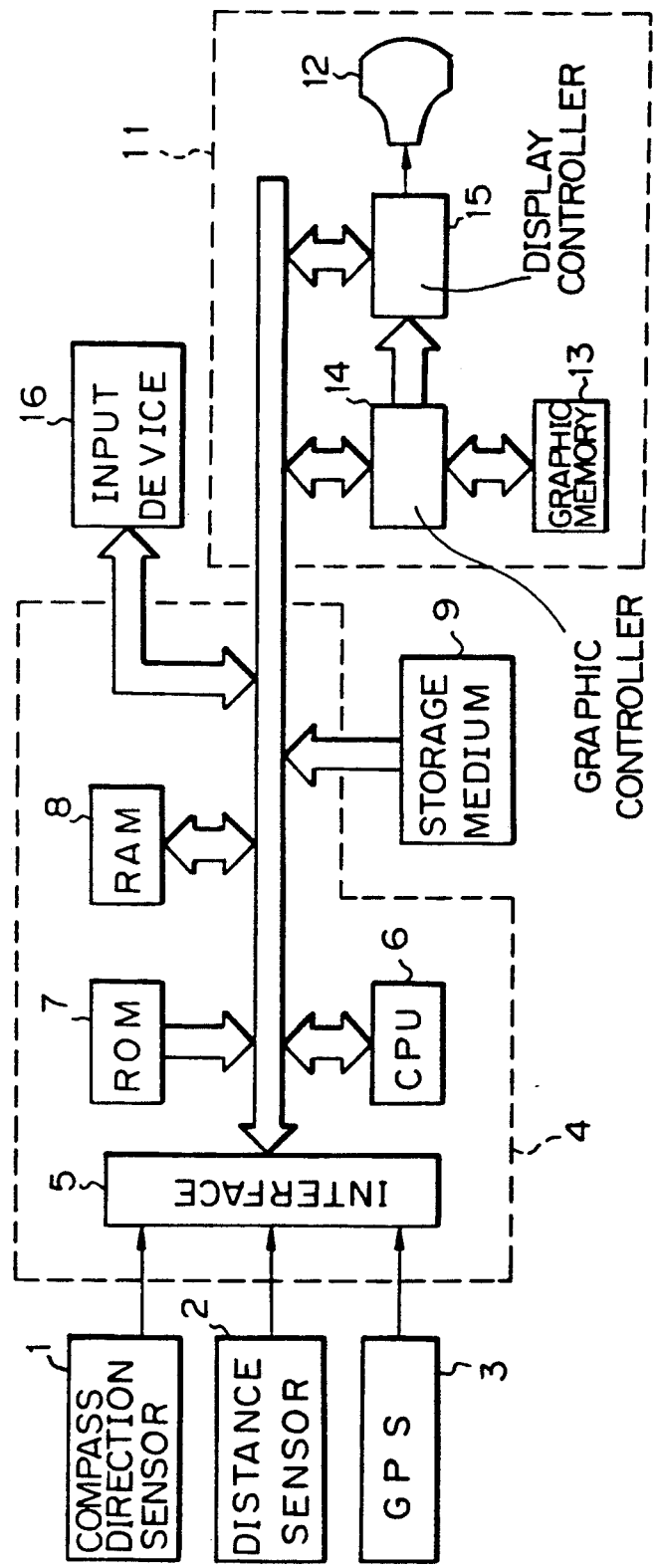
FIG. 1 is a block diagram showing an embodiment of the present invention.

FIG. 1 is a block diagram showing an example of the construction of the on-board navigation system to which the travel locus memorizing method according to the present invention is applied. In the figure, the numeral 1 denotes a compass direction sensor which determines the direction of the vehicle on the basis of the terrestrial magnetism (magnetic field of the earth), for example. The reference numeral 2 denotes a distance sensor for sensing the traveling distance of the vehicle, and the reference numeral 3 denotes a GPS (Global Positioning System) for detecting the present position of the vehicle from longitudinal and latitudinal information, etc. Detection outputs of these sensors and systems are supplied to a system controller 4.

The system controller 4 is made up of an interface 5 which receives the detection outputs from the sensors (or system) 1 through 3 and performs processes such as an A/D (Analog to Digital) conversion. A CPU (Central Processing Unit) 6 performs the calculation of the traveling distance of vehicle and the rate of change of the traveling direction of the vehicle with respect to the traveling distance, and so on, on the basis of output data of the sensors (or the system) 1 through 3 supplied from the interface 5 sequentially. A ROM (Read Only Memory) 7 stores various processing programs of the CPU 6 and other necessary information, and a RAM (Random Access Memory) 8 stores information necessary for executing programs.

As an external memory device, the system is provided with a storage medium 9 which is made up of a CD-(Compact Disc) ROM or an IC card or the like having a large capacity, in which digitized (in the numerical form) map data is stored. The CPU 6 performs control operations, when the vehicle is running, to determine the present position of the vehicle on the basis of each output data of the distance sensor 2 and the GPS 3, and reads out from the storage medium 9 the map data of a region of a given area including the present position of the vehicle, and temporarily stores them in the RAM 8, and also supplies them to a display unit 11.

The display unit 11 is made up of a display 12 such as a CRT, a graphic memory 13 made up of a V(Video)-RAM for example, a graphic controller 14 which draws the map data supplied from the system controller 4 in the graphic memory 13 as image data, and outputs this image data, and a display controller 15 which performs control operations to display a map on the CRT display 12 on the basis of image data outputted by the graphic controller 14. An input device 16 such as a keyboard is provided, so that various commands and the like are supplied to the system controller 4 in accordance with the key entry by a user.

As a display method other than the method using the above-described construction, it is also possible to construct the display unit 11 such that numerical data is supplied to a vector scanning type display for example and the graphic memory 13 is omitted. Also, the display may be performed by using map data which is previously given an image form as the data to be stored in the storage medium 9.

Figure 2:
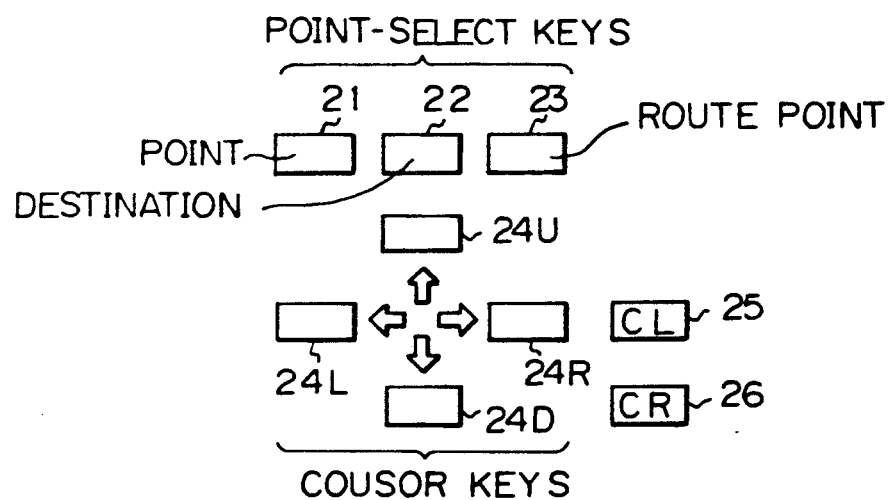
FIG. 2 is a diagram showing an example of the arrangement of an operation key group for selecting points in the input device of FIG. 1.

FIG. 2 shows an example of the arrangement of operation keys in the input device 16 for selecting points. The operation keys comprise point-select keys 21 through 23 for commanding the selection of the point, the target point, and the route point respectively, four display keys 24U, 24D, 24L and 24R for commanding the movement of a cursor (not shown) displayed on the display screen 12 in four directions of the upward, downward, left and right directions respectively, a CL (clear) key 25 functioning as a delete command key for commanding the elimination, from the graphic memory 13, of coordinate data of the area near the point at which the cursor is placed, and a CR (carriage return) key 26 functioning as a register command key for commanding the registration, in the graphic memory 13, of the coordinate data of the area near the point at which the cursor is placed.

Referring to the flowcharts of FIGS. 3A-1, 3A-2, 3B-1 and 3B-2, the procedure of selecting points performed by the CPU 6 will be explained hereinafter. It is assumed that a vehicle's mark indicating its own position is displayed on the display 12 together with a map covering a certain area around the present position of the vehicle.

As shown in FIGS. 3A-1 and 3A-2, the CPU 6 at first judges whether or not any one of the cursor keys 24U, 24D, 24L, 24R, point key 21, destination key 22, and route point key 23 is operated for key entry (steps S1 through S4). If there is a key entry by one of the cursor keys 24U, 24D, 24L, and 24R, a value "1" is set to the flag (step S5). Similarly, "2" is set to the flag when there is a key entry by the point key 21, "3" is set to the flag when there is a key entry by the destination key 22, and "4" is set to the flag when there is a key entry by the route point key 23 (steps S6 through S8).

Subsequently, the CPU 6 performs the control operations to eliminate the vehicle's mark from the display 12 (step S9), to display instead the cursor at a position of coordinates (PX, PY) of the present position stored in the graphic memory 13 (step S10), and to display at the same time that the apparatus is operating in the point selecting mode, in an upper area of the screen of the display 12 (step S11). These control operations are performed via the display controller 15. Successively, the CPU 6 again judges whether or not any one of the cursor keys 24U, 24D, 24L, 24R, point key 21, destination key 22, and route point key 23 is operated for key entry (steps S12 through S15), and further judges whether or not the CL key 25 or the CR key 26 is operated for key entry (steps S16 and S17).

If there is a key entry by one of the cursor keys, the CPU 6 judges which direction is designated by the key entry (steps S18 through S21), moves the cursor in the judged direction by one dot (steps S22 through S25), and returns to step S12 subsequently. If, on the other hand, there is a key entry by the point key 21, the CPU 6 judges whether or not the flag is "2", in step S26. Similarly, the CPU 6 judges as to whether the flag is "3" if there is a key entry by the destination key 22, and whether the flag is "4" if there is a key entry by the route point key (steps S27 and S28). If the flag value is not the number corresponding to each key, the program goes back to step S12. The processing operations when the corresponding number is set to the flag will be described later. On the other hand, if there is a key entry by the CL key 25, the CPU 6 judges whether or not the flag is "1" (step S29), and judges as to whether or not there is a point corresponding to the content of the flag (point, destination or route point) near the coordinates of the cursor (step S30) if the flag is not "1". If according to the content of the flag a point is present, the CPU 6 eliminates, from the graphic memory 13, the picture data of the point according to the content of the flag near the coordinates of the cursor, and eliminates its mark from the display screen (step S31), subsequently the program goes back to step S12. If there is not a point corresponding to the content of the flag, the program goes back to step S12 directly. The processing operation following the case where the flag is detected to be "1" in step S29 will be discussed later.

Figures 2, 3B:
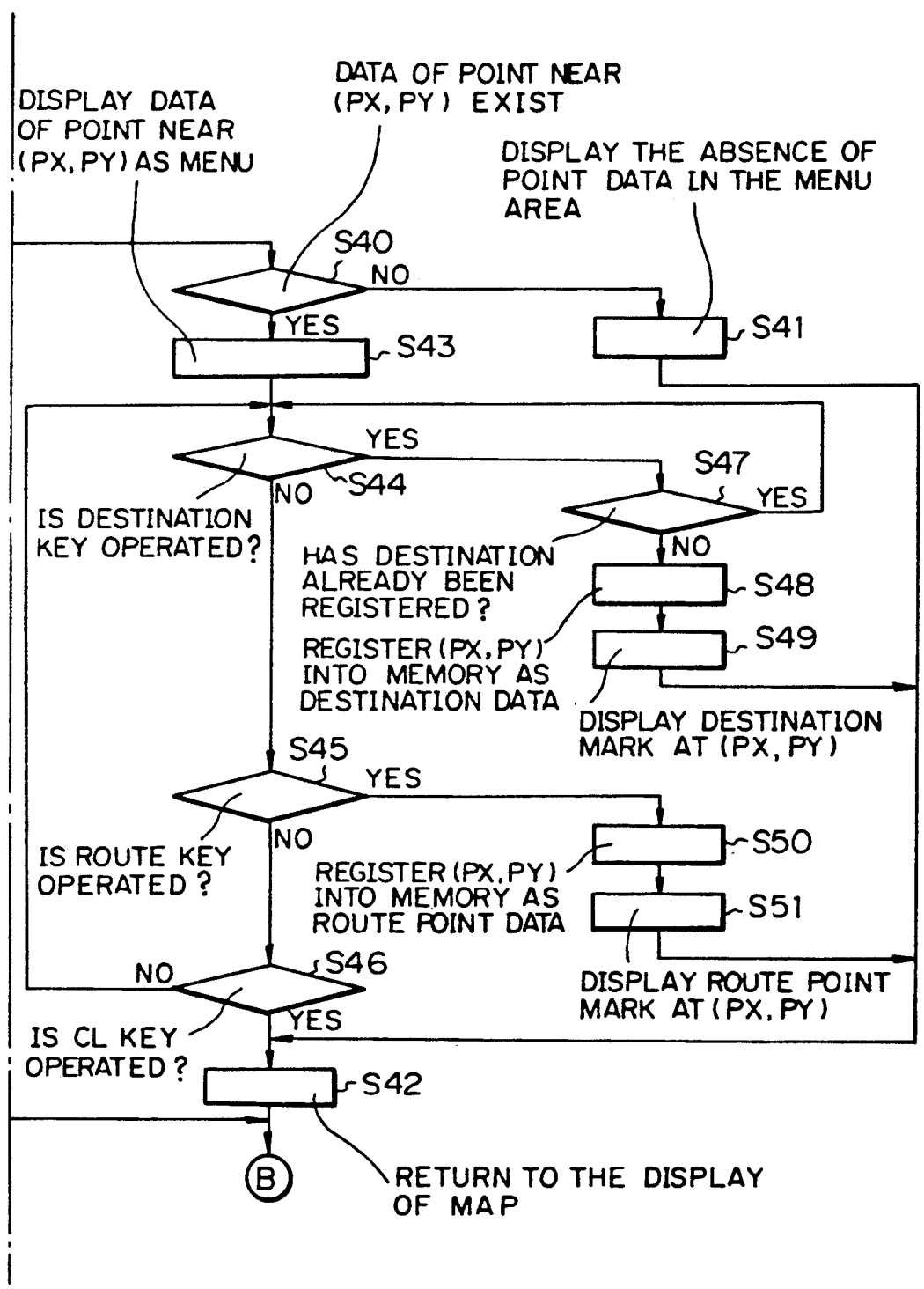

Next, if it is judged in step S17 that there is a key entry by the CR key, the CPU 6 judges as to which value among "1" through "4" is set to the flag (steps S32 through S35), as shown in the flow charts of FIGS. 3B-1 and 3B-2. If the flag is "1", then the CPU 6 registers in the graphic memory 13 the coordinate data (PX, PY) of the point where the cursor is placed, as the present position data (step S36). After that, the CPU eliminates the cursor from the display 12 (step S37), and instead displays the vehicle's mark at the point of coordinates of the present position stored in the graphic memory 13 (step S38), and resets the flag to "0" (step S39) at the same time. Additionally, if the content of the flag is detected to be the corresponding number in steps S26 through S29 mentioned before, the program directly proceeds to step S37, to execute processing operations described above.

If the flag is "2", the CPU 6 judges whether or not a coordinate data near the point (PX, PY) where the cursor is placed exists in the graphic memory 13 (step S40). If the answer is negative, then an indication of such a state is displayed on a predetermined area (menu area) of the display (step S41), subsequently the operation returns to the display of a map (step S42), and the program goes back to step S12 illustrated in FIG. 3A-1. On the other hand, if the answer is affirmative, the CPU 6 displays the coordinate data on the menu area of the display 12 (step S43), and judges as to whether or not there is a key entry by any one of the destination key 22, the route point key 23, and the CL key 25 (steps S44 through S46).

In this state, if there is a key entry by the destination key, the CPU 6 judges whether or not the coordinate data has been already registered as the destination (step S47). If the coordinate data has been already registered, the program goes back to step S44. If the coordinate data has not been registered, then the CPU 6 registers the coordinate data as the destination data into the graphic memory 13 (step S48), and subsequently displays a destination mark at a position of the coordinate data (step S49). Then, the program proceeds to step S42. On the other hand, if there is a key entry by the route point key 23, the CPU 6 registers the coordinate data into the graphic memory 13 as the route point data (step S50), and subsequently displays a route point mark at a position of the coordinate data (step S51). Then the program proceeds to step S42. On the other hand, the program directly proceeds to step S42 if there is a key entry by the CL key 25. However, if the key entry is not by the destination key 22 or the route point key 23 or the CL key 25, the program goes back to step S44, and the processing operations of steps S44 through S46 are repeated until there is a key entry by any one of the keys.

If it is judged in step S34 that the flag is "3", the CPU 6 judges whether or not the destination has been already registered (step S52). If the destination has been registered, the program directly goes back to the step S12 in FIG. 3A-1. If the destination has not been registered the CPU 6 registers in the graphic memory 13 the coordinate data (PX, PY) of the point where the cursor is placed (step S53), and subsequently displays the destination mark at the position of that coordinate data (step S54). Then the program proceeds to step S37. On the other hand, if it is detected in step S35 that the flag is "4", the CPU 6 registers in the graphic memory 13 the coordinate data (PX, PY) of the point at which the cursor is placed, as the route point data (step S55), and subsequently displays a route point mark at the position of the coordinate data (step S56). Then the program goes back to step S12 shown in FIG. 3A-1. If it is judged that the flag is not any of "1" through "4", the program directly goes back to step S12 shown in FIG. 3A-1.

In addition, the data which is registered or eliminated into or from the graphic memory 13 in the foregoing description may be registered in the RAM 8 as data of coordinate numeric values, and so on.

In the manner explained above, functions such as the elimination or registration of the coordinate data of a point, the elimination or registration of the coordinate data of a destination, or the elimination or registration of the coordinate data of a route point can be attained by a simple operational procedure of: selecting a desired point on the map around the present position of the vehicle displayed on the display 12, by using cursor keys 24U, 24D, 24L, and 24R, after the key entry by using any one of the point key 21, the destination key 22, and the route point key 23, and subsequently making the key entry by the CL 25 key or the CR key 26. Thus, multiple operations can be attained by a small number of operation keys, and the operation is very much facilitated.

In the above embodiment, three keys, the point key 21, destination key 22, and route point key 23 namely, are used as the point-select keys. However, this is not limitative, and the number of key can be determined arbitrarily.

As explained in the foregoing, the point selecting apparatus according to the present invention is constructed to perform control operations of eliminating or registering the coordinate data of a position near a point indicated by the position of the cursor, which is set by using the cursor keys after the key entry of one of point-select keys, in response to the key entry of the CL key or the CR key. Therefore, each function of eliminating or registering the coordinate data of a point near each point which is set according to the purpose is attained by using the minimum number of operation keys, and following the same simple operational procedure. Thus, the number of operation keys is reduced and the operation is very much facilitated according to the present invention.

What is claimed is:

1. A point selecting apparatus for use in an on-board navigation system configured to display a map on a display on the basis of map data stored in a memory, for arbitrarily selecting a point on said map, and for eliminating or registering coordinate data of a point in the vicinity of a selected point from or into said memory, said apparatus comprising:
    a plurality of point-select keys each having a different function, said plurality of point-select keys including a point point-select key, a destination point-select key, and a route point-select key used to designate a route, only one of said point-select keys being required to be operated to designate a point, a destination, or a route;
    four cursor keys for commanding movement of a cursor displayed on said display in the four directions of upward, downward, left and right on said display;
    a delete command key for commanding elimination of coordinate data of a point in the vicinity of a point where said cursor is placed when said coordinate data of said point is to be eliminated;
    a register command key for commanding registration of coordinate data of a point in the vicinity of a point where said cursor is placed when said coordinate data of said point is to be registered; and
    control means for controlling elimination of said coordinate data from said memory and registration of said coordinate data into said memory, wherein said control means performs control operations to eliminate or register coordinate data of a point in the vicinity of a point indicated by a position of said cursor after a key entry of a point-select key, in response to a key entry of said delete command key or said register command key.

2. A method of updating an on-board navigation system, comprising the steps of:
    (a) determining whether one of a point key, a destination key, and a route point key has been operated;
    (b) if step (a) results in a determination that one of said point, destination, and route point keys have been operated, setting a flag in a register to a value corresponding to the key which has been operated;
    (c) determining whether one of a plurality of cursor key has been operated;
    (d) determining whether one of a delete command key and a register command key has been operated;
    (e) if said register command key was operated as determined in step (d) and said destination key was operated as determined in step (a), registering onto a memory coordinates of a cursor as destination point data;
    (f) if said register command key was operated as determined in step (d) and said route point key was operated as determined in step (a), registering into memory coordinates of said cursor as route point data; and
    (g) if said delete command key was operated as determined in step (d), eliminating data of a point, corresponding to a flag set in step (b) near coordinates of said cursor, from said memory.

* * * * *